Figure 1:
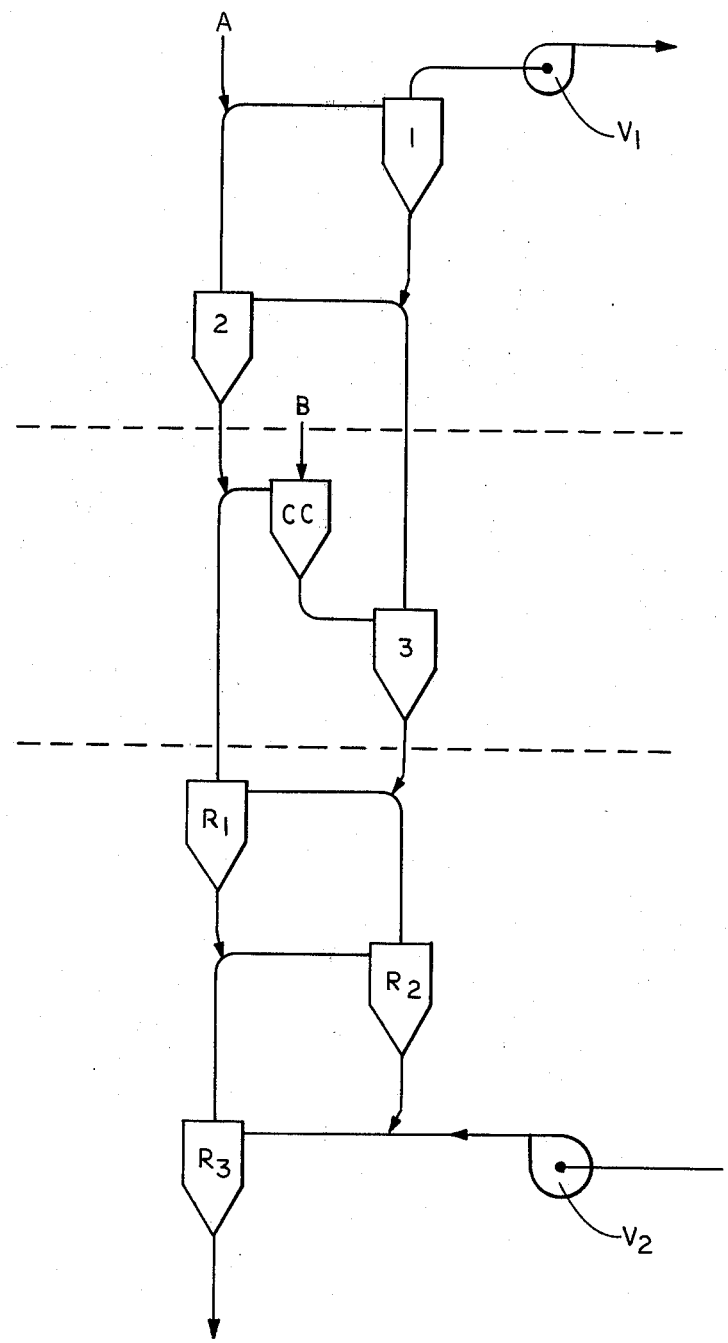

United States Patent [19]

Henin

[11] 4,321,238
[45] Mar. 23, 1982

[54] PROCESS FOR HIGH TEMPERATURE PHOSPHATE ORE BURNING

[75] Inventor: Jean-Pierre Henin, La Madeleine, France

[73] Assignee: Fives-Cail Babcock, Paris, France

[21] Appl. No.: 29,991

[22] Filed: Apr. 16, 1979

[30] Foreign Application Priority Data

Apr. 20, 1978 [FR] France ............... 78 11673

[51] Int. Cl.³ .................................. C01F 11/46
[52] U.S. Cl. ........................... 423/167; 423/320; 432/14; 432/58
[58] Field of Search ................. 432/13, 14, 15, 358; 423/167, 320

[56] References Cited

U.S. PATENT DOCUMENTS

| 2,030,628 | 2/1936 | Freeman | 423/542 |
|---|---|---|---|
| 2,733,137 | 1/1956 | Swaine et al. | 423/542 |
| 3,266,788 | 8/1966 | Jukkola | 423/167 |
| 3,452,968 | 7/1969 | Shimiizu et al. | 432/58 |
| 3,869,248 | 3/1975 | Hirai et al. | 432/106 |
| 3,872,211 | 3/1975 | Wall | 423/167 |
| 3,998,929 | 12/1976 | Leyshon | 423/167 |
| 4,017,585 | 4/1977 | Angevine et al. | 432/15 |

OTHER PUBLICATIONS

Reh, "Fluidized Bed Processing," Chemical Engineering Progress, vol. 67, No. 2 (Feb. 1971), pp. 58-63.

Primary Examiner—Earl C. Thomas
Assistant Examiner—Wayne A. Langel
Attorney, Agent, or Firm—Kurt Kelman

[57] ABSTRACT

High temperature phosphate are burning process in which the ore is preheated by gases produced by the combustion of a fuel in the burning zone, and then enters the burning zone and is cooled by a current of cool air which is used, at least partly, as combustion in the burning zone, characterized by the fact that burning is carried out in a static combustion chamber in which the preheated ore is placed in suspension in the current of air which has cooled the burned ore and in which fuel is injected, whereby the combustion of air and fuel supplies the required heat for burning, and that the retention time of the ore in the combustion chamber is less than thirty seconds, the burned ore being blow out of the chamber by the gases resulting from the combustion of the fuel injected into the chamber.

10 Claims, 5 Drawing Figures

FIG I

PROCESS FOR HIGH TEMPERATURE PHOSPHATE ORE BURNING

High temperature phosphate burning is burning at a temperature high enough to cause the decomposition of calcium carbonate with the release of $CO_2$, as opposed to burning at moderate temperature which is only intended to remove organic matter from the phosphates.

It is known that high temperature phosphate burning is an extremely difficult operation which can cause considerable damage to the product being burned; in fact, incidental interfering phenomena occur within the range of temperatures to which the ore has to be heated for decarbonation (700° to 900° C.). These phenomena basically consist of:

The formation of calcium silicates, essentially $(CaO_2)SiO_2$

An increase in size of the apatite crystals caused by a phenomenon similar to sintering: crystals sticking to each other.

In a conventional phosphate ore beneficiation line the ore, after washing and possibly burning, is transformed into phosphoric acid by the sulphuric acid which attacks it. An important measure of the quality of this ore is its reactivity, a parameter controlling the length of time which is required for the ore to be attacked by the sulphuric acid.

The interfering phenomena indicated above cause a decrease which can be highly significant in the reactivity of the ore, by reducing the reaction surface between the ore and the attacking liquid by shutting the open pores which normally exist in the ore and by the formation of a cement around the apatite.

This defect can be partly compensated for by washing the ore and regrinding it after burning. However, these measures are often inadequate and there is a risk that the processing of the ore thus obtained might be uneconomical.

On the other hand, the formation of calcium silicate stabilizes a part of the calcium in the ore which could not be removed by the washing process downstream of the kiln.

Lastly, the formation of calcium silicate and possibly of other compounds gives rise to concretion inside the kiln. This brings about serious kiln operation problems.

These various drawbacks are regularly encountered with kilns currently used for high temperature burning, whether they be fluidization kilns or counterflow rotary kilns.

An analysis of the phenomena reveals that the decarbonation of the calcium carbonate depends almost entirely upon the maximum temperature to which the ore is heated and that at a certain temperature limit (in the region of 850° to 950° C.), depending upon the ore being processed, almost all the $CO_2$ in the carbonate is removed; thus nothing is gained by increasing this reaction temperature. On the other hand, the extent of the interfering phenomena is directly dependent upon the retention time of the ore in the high temperature zone of the kiln, and it increases as the temperature rises. This is the case with the increase in size of the apatite crystals. The same applies as regards the formation of calcium silicate, this reaction being controlled by the probability of contact between the CaO and the $SiO_2$, this probability being connected, at least partly, with the retention time in the high temperature zone of the kiln.

When the ore contains organic matter, the latter normally distils at a fairly low temperature (for example between 250° and 400° C.). The processing of ore such as this in counterflow rotary kilns involves the distillation of organic matter in zones in which the combustion heat of the matter cannot be recovered, either because the matter distils without burning or because it burns, but in a part of the burning unit in which this heat cannot be used and serves only to heat the flue-gases.

The aim of this invention is to keep to a minimum the incidental interfering phenomena connected with phosphate burning, while allowing satisfactory recovery of the combustion heat from the organic matter when the ore contains the latter.

In accordance with the invention, burning takes place in a stationary combustion chamber in which the preheated ore is placed in suspension in an air current which cools the burned ore, and in which fuel is injected whereby the combustion of the air and fuel supplies the required heat for burning. The retention time of the ore in the combustion chamber is less than thirty seconds, the burned ore being driven out of the chamber by the gases resulting from the combustion of the fuel injected into the chamber.

As compared with the known processes in which the heat required for burning is supplied by a flow of hot gases having a temperature substantially higher than the ore burning temperature whereby the heat losses and the low thermal exchange coefficients are taken into account, the process of the invention, according to which the fuel is dispersed into the mass of ore particles in suspension and the combustion takes place within said mass, permits substantially to reduce the fuel consumption.

There are numerous types of stationary combustion chambers which can be used with this invention; such chambers are used especially in the cement industry for the pre-burning of raw materials before they enter the rotary kiln.

In particular, a vertical chamber made up of an upper cylindrical section and a lower section can be used. The lower section is in the shape of a reversed truncated cone connected by its large base to the bottom of the cylindrical section, and it contains at its top end a tangential inlet for the air and the ore, fuel injectors being located on the ceiling or the cylindrical wall of the chamber. This lower section contains at its bottom end an axial outlet for the combustion gases and burned ore.

Along conventional lines, the combustion chamber outlet is connected to a cyclone separator in which the burned ore is separated from the combustion gases. Since the lime which is formed is usually made up of ultra-fines, the head cyclone separator also permits a considerable amount of this lime to be removed by elutriation.

The retention time of the ore in the combustion chamber and the separator will for example be in the region of 10 seconds, whereas the retention time in conventional kilns is between 15 and 90 minutes. According to the type of chamber, the ore is held in suspension during the whole of its retention time in the chamber in which the temperature is high, or it moves in a thin layer along the walls of the chamber, which in all cases ensures an even temperature of the mass of ore particles.

It is advantageous to let the ore in suspension in the combustion air flow because, in this way, the coolest ore is in the hottest zone of the combustion chamber, which greatly reduces the risk of local overheating. This type of feeding system also allows the ore inlet temperature to be adjusted so as to keep to a minimum the loss of organic matter caused by distillation in the preheater. In each particular case, this adjustment is made taking into account the distillation curve of this matter with respect to temperature.

The maximum temperature of the ore is reached at the combustion chamber outlet; this temperature is thus very close to the temperature of the combustion gases. Consequently, so as to obtain a top quality burned product, the ore discharge temperature which is very consistent can most easily be controlled and regulated by simple adjustment of the gas temperature at the combustion chamber outlet.

The preheating of the ore is ensured by the gases leaving the combustion chamber, for example in a cyclone exchanger of the type generally used in the cement industry.

The recovery of the sensible heat from the burned ore is carried out, at least partly, by heating the secondary air used in the combustion chamber; for this, either a rotary cooler of the type generally used on the delivery side of rotary ore kilns, or a cyclone exchanger can be used.

The number of stages of the cyclone exchangers used for the preheating and cooling of the burned ore is determined, in each case, according to the characteristics of the ore being processed, in particular its moisture content and organic matter content, the maximum admissible temperature at the combustion chamber inlet, the optimal burned ore discharge temperature and, taking into account thermal consumption, the power necessary for ventilation and the corresponding capital expenditure.

The number of stages is generally reckoned to be between 2 and 4 for the preheater as well as for the cooler. The thermal requirements of phosphate ore burning are fairly low and consequently the same applies as regards the flow of gases leaving the combustion chamber. Thus the flow of gases into the combustion chamber can be increased in order to ensure proper pneumatic conveyance and suspension of the ore. This increase in the flow of gases can be brought about either by letting an excess of air into the cooler-combustion chamber unit, or by recycling the gases from the preheater to the combustion chamber; in the last case, an excess of air can be passed through the cooler and drawn off upstream of the combustion chamber in order to be discharged into the atmosphere or reintroduced into the preheater, for example next to the ore inlet.

The recycling in the combustion chamber of gases leaving the preheater makes it possible to regulate the temperature in the chamber and to adjust the ore temperature at the chamber inlet.

Whichever circulation scheme is chosen (excess of air or recycling of flue-gases), it may be necessary to allow some leeway when adjusting the burned ore discharge temperature in order to obtain the maximum quenching effect in the slaking operation carried out at the outlet of the burning unit. This burned ore discharge temperature can be adjusted by modifying the flow of air into the cooler. For example, if the cooler consists of two cyclones and, if the burned ore leaves the combustion chamber at 800° C., the ore leaving the cooler will have a temperature of around 150° C. if the mass flow of air into the cooler is equal to twice the flow of burned ore, and a temperature of around 300° C. if these flows are equal.

In other respects, it is obvious that, if need be, the grain size of the ore will have to be made fairly small in order to allow the pneumatic conveyance of the latter, this reduction in grain size can be incorporated into the ore prewashing operation or be carried out just before burning. In the last case, it may be worthwhile to carry out this reduction in a grinding and drying mill, for example of the rotary type, in which the ore is dried by the flue-gases leaving the preheater; in this case, the excess of air from the cooler, along with the flue-gases, can also be let into the dryer, the flue-gas and hot air flows being adjusted depending on the thermal requirements of the dryer, for example by regulation according to the dryer outlet temperature.

Moreover, this invention makes it possible to subject the ore to be burned to sudden thermal variations (thermal shocks), as much in the burning phase as in the cooling phase, provided that a cyclone exchanger cooler is used. These thermal shocks cause the phosphate ore to become brittle, which, by increasing its reactivity, makes the burned product more suitable for subsequent chemical treatment.

The following description refers to the accompanying drawings which show some of the many embodiments of this invention.

Figure 3:
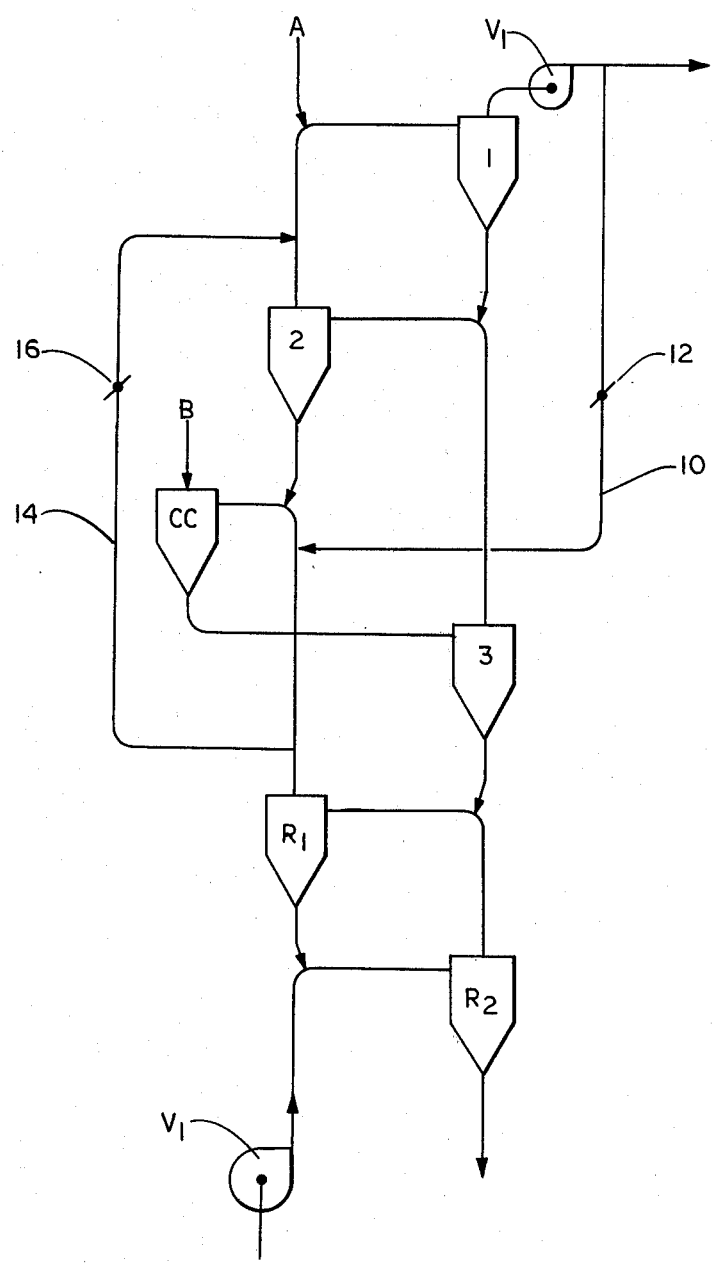
Figure 4:
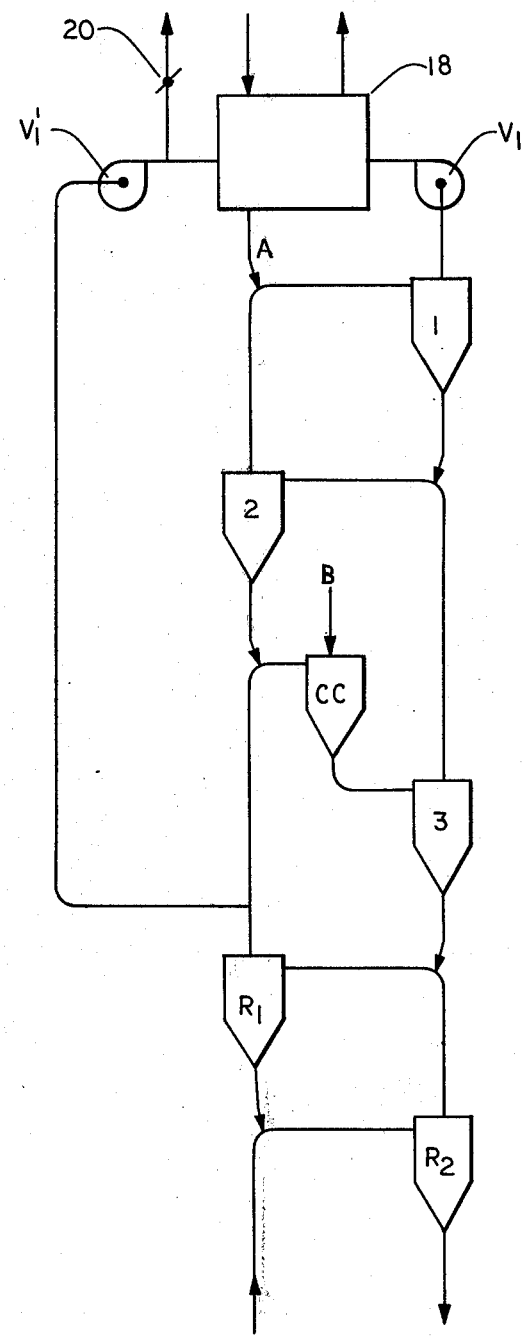
Figure 5:
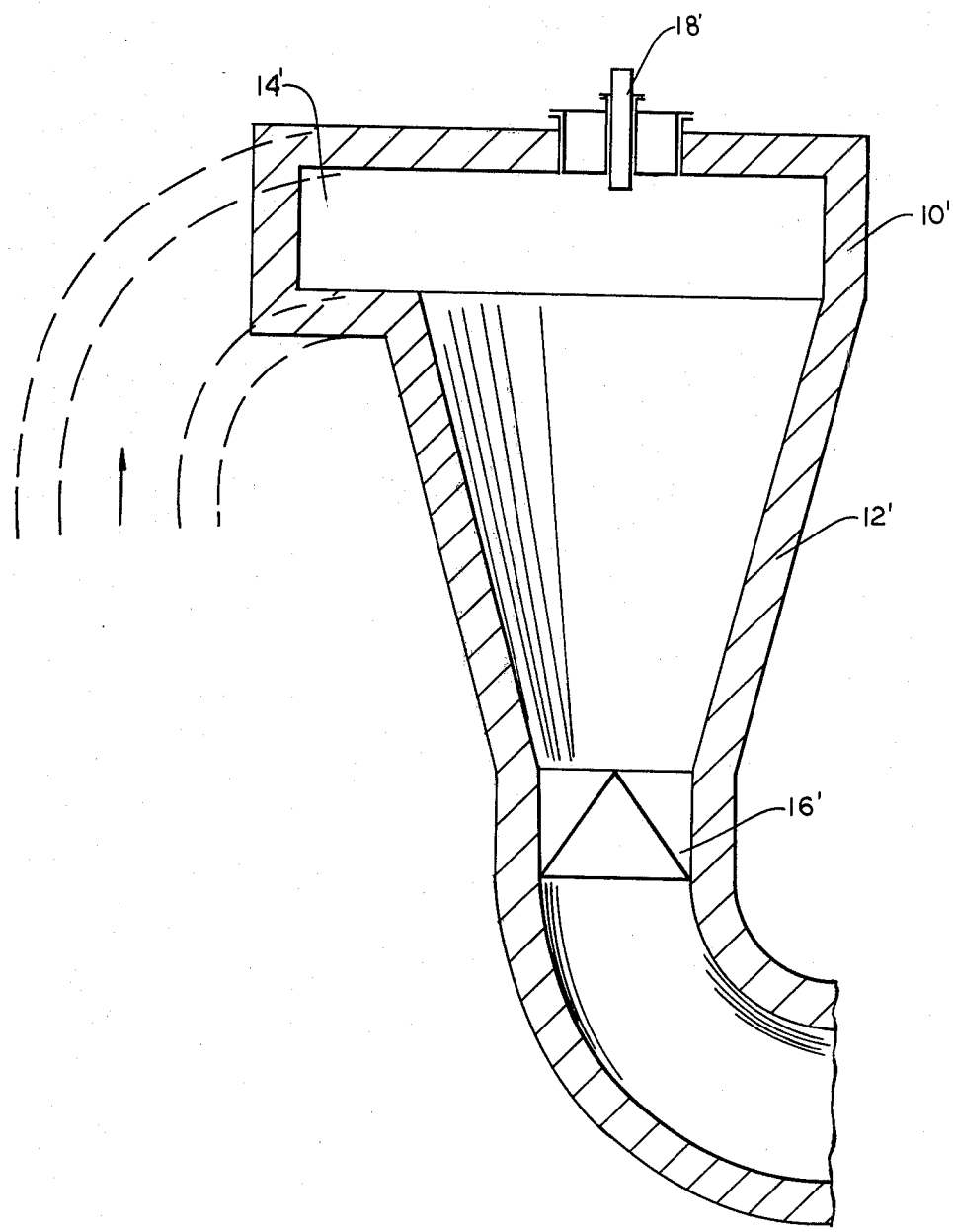

FIGS. 1, 2, 3 and 4 are diagrams of the equipment useful for the process of the invention, FIG. 5 showing a sectional view of a combustion chamber.

The equipment represented diagramatically in FIG. 1 consists of a preheater containing two cyclones 1 and 2, a combustion chamber CC connected to a cyclone 3 and a cooler including three cyclones $R_1$, $R_2$ and $R_3$; fans $V_1$ and $V_2$ ensure the circulation of the flue-gases and the air.

The combustion chamber is a circular, vertical chamber, made up of an upper cylindrical section 10' and a lower section 12' in the shape of a reversed truncated cone connected by its large base to the bottom of the cylindrical section. It contains at its top end a tangential inlet 14' for the air and the ore, and at its bottom end an axial outlet 16' for the combustion gases and burned ore, one or more fuel injectors 18' being located on the ceiling of the chamber.

During operation, the ore, in a powdery form, is let through A into the duct connecting cyclones 1 and 2 and is driven into cyclone 1 by the gases circulating in this duct due to the negative pressure created by fan $V_1$; these gases come from the combustion chamber and, during this travel, lose some of their heat to the ore.

The ore separated in cyclone 1 is let into the duct connecting cyclone 3 to cyclone 2 in which it is again placed in suspension in the hot gases leaving the combustion chamber.

In cyclone 2 the ore is separated from the gases and is then let into the duct connecting cyclone $R_1$ to the combustion chamber in which circulates the air which has passed through cyclones $R_1$, $R_2$ and $R_3$ and has been heated by the burned product. The ore-laden air current enters the combustion chamber tangentially. A fuel injected through B into the combustion chamber burns on contact with the air and supplies the heat necessary for burning; this fuel can be solid, liquid or gaseous in form. The ore, which is either in suspension in the gaseous current, or which moves in a thin layer along the walls of the chamber, is burned very rapidly, then discharged through the outlet located at the bottom end of the chamber. In cyclone 3, the burned ore is separated from the combustion gases and then let into the successive stages of the cooler in which it is cooled by air from fan $V_2$ and finally extracted from the bottom of cyclone $R_3$. As explained above, the hot gases leaving cyclone $R_3$ are used to preheat the ore before it is sent into the combustion chamber.

By way of example, if a phosphate ore with 11% moisture, 2.5% crystal water, 0.5% carbon and 12% $CO_2$ in the form of calcium carbonate is to be burned in this installation, 0.04 kg of fuel-oil and 0.7 kg of air per kg of burned ore are introduced into the combustion chamber.

The ore fed through A at a temperature of about 20° C. is heated by the flue-gases from the combustion chamber to reach a temperature of about 430° C. at the outlet of the cyclone 2.

At the outlet of the cyclone 3, the temperature of the burned ore is of around 850° C. and that of the flue-gases is around 900° C.

The burned ore is cooled in the cyclones $R_1$ and $R_2$ to a temperature of about 550° C. by the air which is supplied to the combustion chamber. An air flow rate higher than that used in the combustion chamber is supplied to the cyclone $R_3$ and cools the burned ore to a temperature of about 250° C.; the air in excess is discharged into the atmosphere at the outlet of the cyclone $R_3$.

The flue-gases flowing out of cyclone 1 have a temperature of around 160° C.

Figure 2:
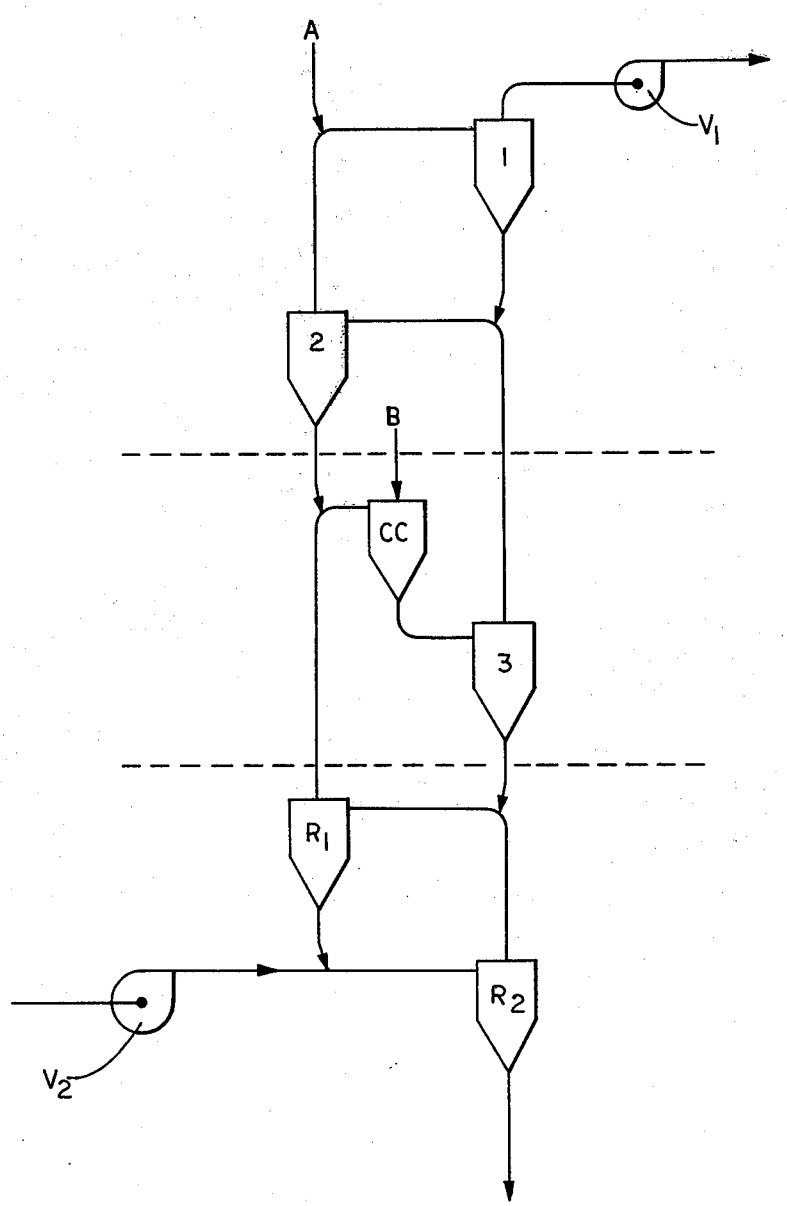

The only difference between the equipment in FIG. 2 and that in FIG. 1 lies in the make-up of the cooler in FIG. 2, which only contains two cyclones $R_1$ and $R_2$.

In the equipment in FIG. 3, in which the cooler also only contains two cyclones, some of the flue-gases leaving cyclone 1 are recycled upstream of the combustion chamber by means of a pipe 10, upon which an adjusting vane 12 is fitted. This recycling makes it possible to adjust the temperature of the gases in the combustion chamber and to control the temperature of the ore at the chamber inlet. It also makes it possible to maintain a flow of gases sufficient to ensure the pneumatic conveyance of the ore. In this equipment (FIG. 3), an excess of air is used in the cooler $R_1$-$R_2$ compared to the flow necessary for the combustion of the fuel in the combustion chamber. This excess of air is drawn off upstream of the chamber and reinjected into the preheater between cyclones 1 and 2 by means of a pipe 14 upon which is fitted an adjusting vane 16. This embodiment can be useful for ensuring the pneumatic conveyance of the burned ore into the cooler. The excess air could be discharged into the atmosphere or fed into the combustion chamber.

In the equipment in FIG. 4, the gases leaving the preheater 1-2 and some of the excess air drawn off from the outlet of cooler cyclone $R_1$ are used to dry the moist ore in a grinding and drying mill 18.

Fan $V_1'$ and adjusting vane 20 set the flow of air used in the grinding and drying mill.

Should the ore be moist, but still have a grain size which would allow pneumatic conveyance during this phase, it can be advantageous to use a flash dryer fed by the hot gases leaving the preheater and/or by the excess air drawn off from the cooler.

The illustrated embodiments for flue-gas circulation and reintroduction of the excess air do not represent the only possible embodiments of the present invention. These two gases can be reintroduced into any stage of the equipment, bearing in mind in particular the required range of temperatures.

What we claim is:

1. A high temperature phosphate ore burning process, comprising the steps of
   (a) preheating the ore while suspended in gases discharged from a stationary combustion zone,
   (b) supplying a stream of air to the combustion zone,
   (c) injecting and dispersing the preheated ore and a fuel into the stream of air whereby the air causes the fuel to be combusted to produce heat for burning the ore,
   (d) permitting the ore while suspended in the stream of air to dwell in the combustion zone in suspension for less than 30 seconds,
   (e) discharging the burned ore and gases produced by the combustion of the fuel from the combustion zone through a common outlet,
   (f) separating the burned ore from the gases, and
   (g) cooling the separated burned ore by means of cold air,
      (1) the stream of air supplied to the combustion zone being at least partially constituted by the cooling air.

2. The burning process of claim 1, wherein the combustion zone is in a chamber having a circular cross section, the stream of air being supplied to the chamber tangentially.

3. The burning process of claim 2, wherein the preheated ore is injected and dispersed into the stream of air before the stream of air is supplied to the chamber and the fuel is injected into the stream of air having the preheated ore dispersed therein in the chamber.

4. The burning process of claim 3, wherein a fraction of the gases used for preheating the ore is supplied to the combustion zone, and comprising the further step of controlling the flow rate of the fraction of gases supplied to the combustion zone to maintain the temperature in the combustion zone below a predetermined temperature.

5. The burning process of claim 1, wherein a fraction of the gases used for preheating the ore is supplied to the cumbustion zone.

6. The burning process of claim 5, comprising the further step of controlling the flow rate of the fraction of the gases supplied to the combustion zone to maintain the temperature in the combustion zone within a predetermined value.

7. The burning process of claim 1, wherein the stream of air supplied to the combustion zone has a rate of flow higher than that necessary for the combustion of the fuel in the combustion zone and is used for cooling the ore before it is injected into the combustion zone.

8. The burning process of claim 1, wherein the stream of air supplied to the combustion zone is a fraction of the cooling air and another fraction of the cooling air constitutes the gases used for preheating the ore.

9. The burning process of claim 1, wherein the stream of air supplied to the combustion zone is a fraction of the cooling air and another fraction of the cooling air is used for drying the ore before it is preheated.

10. The burning process of claim 1, wherein the burned ore is cooled by suspending the burned ore in a stream of the cold air.

* * * * *